United States Patent [19]

McManis et al.

[11] Patent Number: 4,632,889
[45] Date of Patent: Dec. 30, 1986

[54] LITHIUM COMPOSITE ANODE

[75] Inventors: George E. McManis; Aaron N. Fletcher; Dan E. Bliss, all of Ridgecrest, Calif.

[73] Assignee: The United States of America as represented by the Secretary of the Navy, Washington, D.C.

[21] Appl. No.: 751,357

[22] Filed: Jul. 2, 1985

[51] Int. Cl.$^4$ ...................... H01M 4/58; B22D 19/14
[52] U.S. Cl. .................................. 429/218; 29/623.1; 164/97
[58] Field of Search .......................... 429/218; 164/97; 428/558; 29/623.1

[56] References Cited

U.S. PATENT DOCUMENTS

| | | | |
|---|---|---|---|
| 3,110,632 | 11/1963 | Zellhoeffer | 136/100 |
| 3,462,313 | 8/1969 | Rightmire et al. | 136/100 |
| 3,501,291 | 3/1970 | Schneider | 428/558 X |
| 3,567,516 | 3/1971 | Rightmire et al. | 136/6 |
| 3,580,828 | 5/1971 | Reddy | 204/14 |
| 3,957,532 | 5/1976 | Settle et al. | 136/75 |
| 4,011,372 | 3/1977 | Tomczuk et al. | 429/218 |
| 4,048,395 | 9/1977 | Lai | 429/112 |
| 4,056,885 | 11/1977 | Rao | 29/623.1 |
| 4,162,352 | 7/1979 | Sutula et al. | 429/29 |
| 4,172,926 | 10/1979 | Shimotake et al. | 429/112 |
| 4,221,849 | 9/1980 | Harney | 429/112 |
| 4,233,376 | 11/1980 | Atkinson et al. | 429/218 X |
| 4,436,796 | 3/1984 | Huggins et al. | 429/112 |

Primary Examiner—Brian E. Hearn
Assistant Examiner—Stephen J. Kalafut
Attorney, Agent, or Firm—W. Thom Skeer

[57] ABSTRACT

An elemental lithium-lithium alloy composite anode capable of high current density discharge for battery applications.

6 Claims, No Drawings

LITHIUM COMPOSITE ANODE

BACKGROUND OF THE INVENTION

1. Field of the Invention

This invention relates to batteries. More particularly, this invention relates to lithium composite anode materials capable of high current density discharge. Still more particularly, but without limitation thereto, this invention relates to an anode comprising a lithium-lithium alloy composite. In the composite, the lithium alloy acts to immobilize and control the surface area of the liquid lithium phase so as to minimize the direct chemical reaction of pure lithium with the battery components.

2. Description of the Prior Art

Lithium is the most electronegative element and is therefore a very suitable anode material for batteries. However, elemental lithium has a low melting point around 180° C. which limits the safe use of pure lithium anodes to relatively low temperatures.

Lithium-aluminum and lithium-silicon alloys are difficult to form into anodes because they are hard and brittle materials. Furthermore, anodes formed from these materials tend to delaminate once formed. Lithium does form a composite anode material when mixed with finely divided iron powder but anodes thus formed are heavy and have low energy densities.

SUMMARY OF THE INVENTION

According to this invention an anode composite material is formed between the highest melting alloy of lithium-aluminum or lithium-silicon and elemental lithium. The composite is made by first forming the highest melting Li-Al or Li-Si alloy, cooling and then grinding the alloy into a powder. This Li-Al or Li-Si powder is then fused at from about 400° C. to about 450° C. with elemental lithium in weight ratios of from about 1 part lithium to about 4 parts alloy powder, and subsequently casting into a mold for cooling and configuring into anodes.

OBJECTS OF THE INVENTION

One object of this invention is a method of manufacturing a lithium composite anode for batteries.

Another object of the invention is a lightweight lithium-lithium alloy composite anode which discharges at high rates in a variety of electrolytes.

Yet another object of this invention is an easily fabricated anode made of a composite of elemental lithium and lithium-aluminum or lithium-silicon.

Still another object of the invention is a composite having greater stability against unwanted chemical reactions that may degrade battery performance.

These and still further objects, features and advantages of the present invention will become apparent upon consideration of the following detailed disclosure.

DESCRIPTION OF THE PREFERRED EMBODIMENT

This invention allows for discharge of a lightweight lithium-lithium alloy composite anode at high rates in a variety of electrolytes. Experimentation shows discharges in molten nitrate electrolytes at 500 mAcm$^{-2}$ with cell voltages over 2.5 volts.

The lightweight lithium composite anode first discharges at a potential near that of elemental lithium, and then discharges at the potential of the lithium alloy. Therefore, most of the anodic material is electroactive. This allows for very high energy densities in comparison with lithium-iron composites where the iron powder is inert.

This concept applies to the use of lithium in conjunction with an electroactive, high melting (over 700° C.) lithium alloy, including but not limited to Li-Al, Li-Si, Li-Al-Si and Li-Mg, where one or more components of the alloy are active metals, transition metals or metalloids. The preferred embodiment uses elemental lithium with lithium-aluminum or lithium-silicon alloy.

The lightweight anodic material is formed between the highest melting alloy and elemental lithium. The highest melting alloy is prepared, cooled, and ground into a powder. The alloy powder is next mixed together with elemental lithium in a weight ratio of about 1 part elemental lithium to about 4 parts alloy powder at temperatures well below the melting point of the alloy. Fusion with lithium is typically carried out at about 450° C. under an inert atmosphere such as helium or argon in a nickel, low carbon steel, or stainless steel crucible. The composite then is stirred well to insure thorough mixing and cast into a mold for cooling and configuring into a foil for anodes.

While this invention has been described in detail with particular reference to certain preferred embodiments thereof, the following example is offered to illustrate but not limit the invention.

EXAMPLE

A lithium-lithium aluminum composite anode was prepared by heating stoichiometric amounts of lithium and aluminum at from about 660° C. to about 700° C. in a nickel crucible until a homogeneous blend was obtained. After cooling to ambient temperature, the alloy was ground into a powder. This powder was introduced into a suitable 30 ml. crucible made of nickel. Next, elemental lithium was added in a ratio of about 1 part lithium to about 4 parts alloy. The contents were covered and heated at about 450° C. in a sand bath under an inert atmosphere of helium until a thin layer of lithium covered the alloy powder. A uniform composition was thus obtained. The composite mixture was subsequently cast into a mold, cooled to ambient, and configured into a useable form. The resulting, highly malleable material was then pressed onto a steel mesh to form an anode. The lithium-lithium aluminum composite mixture thus formed will further alloy over time or at elevated temperatures to form a nearly homogeneous lithium enriched lithium-aluminum alloy anode. This alloying process can be accelerated after pressing the composite into the steel mesh by sintering the formed anode at moderate temperatures of from about 100° C. to about 450° C. for a period of time dependent on the elemental lithium content of the composite. Thus, solid lithium rich lithium-aluminum alloy anodes may also be fabricated easily by this technique. The physical characteristics of the anodic material simplifies the production of lithium-aluminum anodes and avoids the older methods which utilize extremely high pressures.

Obviously many modifications and variations of the present invention are possible. It should be understood that, within the scope of the appended claims, the invention may be practiced otherwise than as specifically described.

What is claimed is:

1. A method of manufacturing a lithium composite anode for thermal batteries comprising the steps of:
   preparing a homogeneous lithium alloy;
   grinding said alloy into a powder;
   melting elemental lithium onto the surface of said powder to form a uniform heterogeneous mixture;
   cooling said mixture to ambient to form an ingot; and
   configuring said ingot into an anode.

2. The method of claim 1 wherein said alloy is selected from the group consisting of lithium-aluminum and lithium-silicon.

3. The method of claim 1 wherein said alloy is prepared by combining and heating stoichiometric amounts of lithium and a compound selected from the group consisting of aluminum and silicon at a temperature of about 700° C.

4. The method of claim 1 wherein said melting step is conducted in a crucible at a temperature of about 450° C. under an inert atmosphere.

5. The method of claim 4 wherein said crucible is made of a material selected from the group consisting of nickel, low carbon steel and stainless steel.

6. The method of claim 1 wherein said melt is comprised of about 1 part by weight elemental lithium to about 4 parts by weight of said alloy.

* * * * *